Aug. 16, 1949. S. ARONOFF 2,479,455
ELECTRIC MOTOR
Filed Dec. 6, 1943 3 Sheets-Sheet 1

INVENTOR
Samuel Aronoff
BY
Henry G. Dybvig
ATTORNEY

Aug. 16, 1949.　　　　　S. ARONOFF　　　　　2,479,455
ELECTRIC MOTOR
Filed Dec. 6, 1943　　　　　　　　　　　　　3 Sheets-Sheet 2
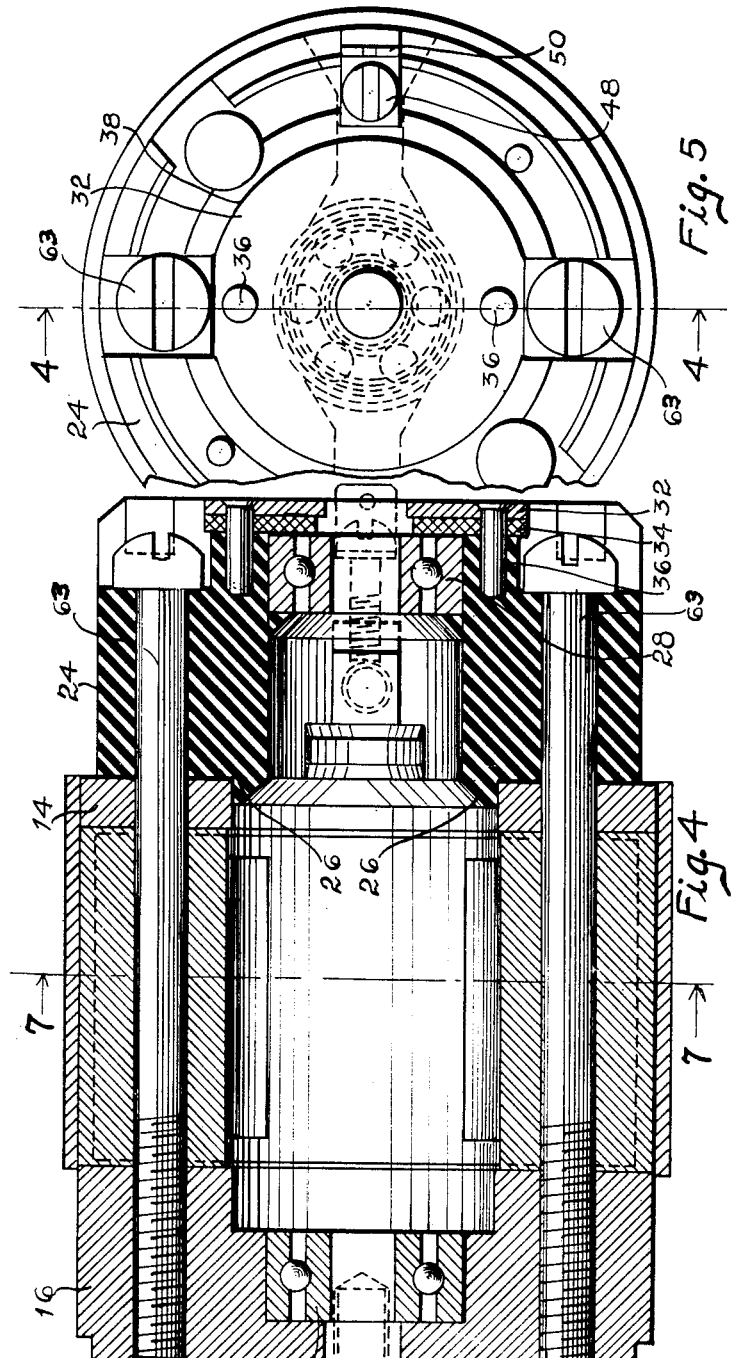
INVENTOR
BY Samuel Aronoff
Henry G. Sylvig
ATTORNEY Aug. 16, 1949.　　　　　　　S. ARONOFF　　　　　　　2,479,455
ELECTRIC MOTOR
Filed Dec. 6, 1943　　　　　　　　　　　　　　3 Sheets-Sheet 3
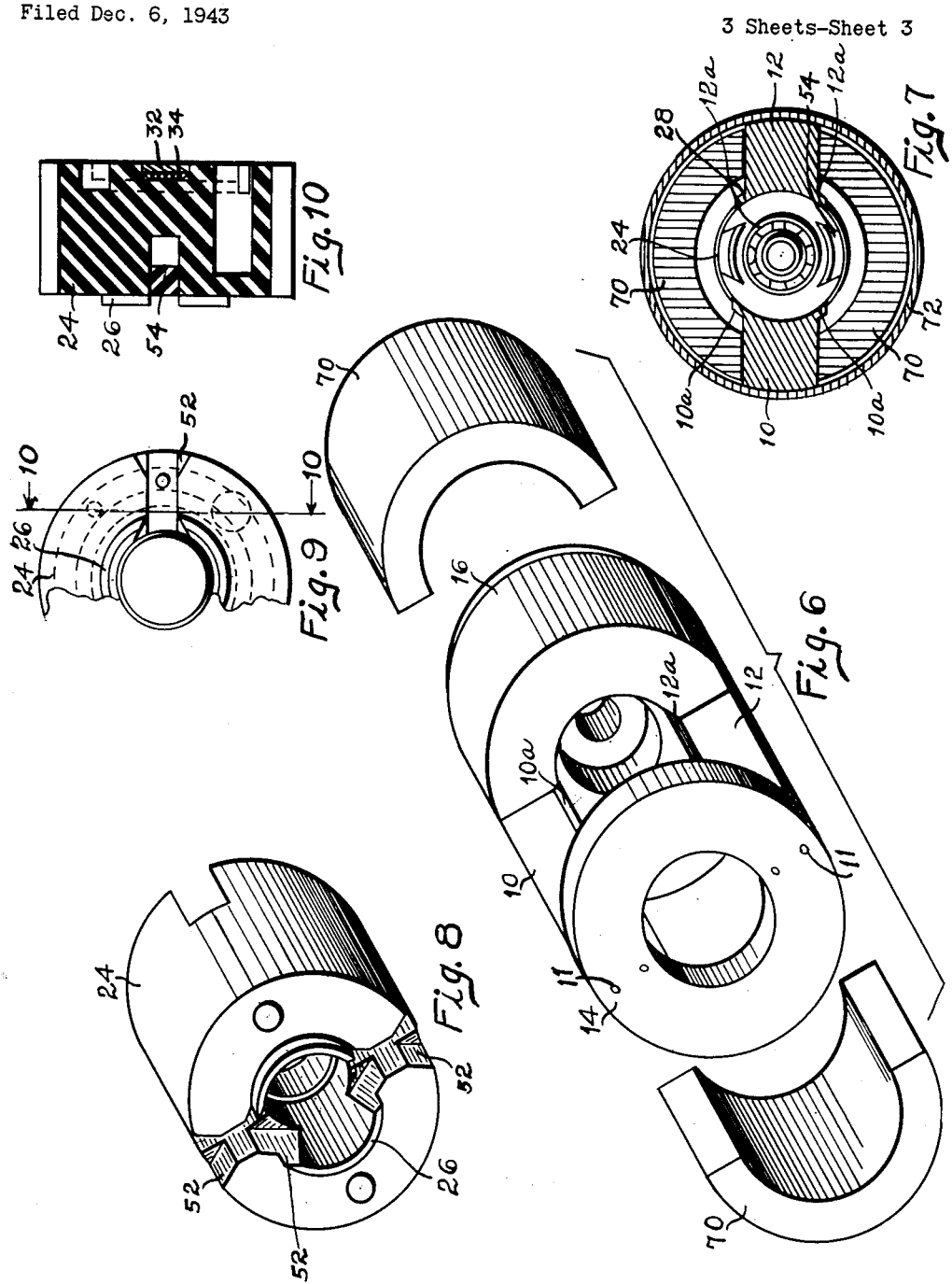
INVENTOR
Samuel Aronoff
BY Henry G. Dybvig
ATTORNEY Patented Aug. 16, 1949

2,479,455

UNITED STATES PATENT OFFICE 2,479,455

ELECTRIC MOTOR

Samuel Aronoff, Dayton, Ohio, assignor to The Globe Industries, Inc., Dayton, Ohio, a corporation of Ohio Application December 6, 1943, Serial No. 513,123

8 Claims. (Cl. 172—36)

1

This invention relates to electric motors and more particularly to fractional horse power electric motors, although the principles incorporated in the structure of this motor may be applicable to larger motors.

An object of this invention is to provide an electric motor having permanent magnets that form magnetic paths for the flux linking the rotor or armature.

Another object of this invention is to provide a pair of diametrically disposed pole pieces held in position by a non-magnetic material and adapted to provide seats for a pair of permanent arcuate magnets.

Another object of this invention is to provide an end frame of insulating material that functions as a support for the bearing in which the rotor is journalled, which end frame functions as a support for the brushes and as a cap for the motor housing.

Another object of this invention is to provide a pair of metallic rings of non-ferromagnetic material that cooperates with the pole pieces in forming a seat for permanent magnetic poles.

Another object of this invention is to provide an end frame member provided with radially disposed channels adapted to receive the brushes and a spacing member holding the brushes in position.

Other objects and advantages reside in the construction of parts, the combination thereof and the mode of operation, as will become more apparent from the following description.

In the drawings, Figure 1 discloses a longitudinal cross sectional view of the motor taken substantially on the line 1—1 of Figure 2.

Figure 4 is a longitudinal cross sectional view of the stator taken substantially on the line 4—4 of Figure 5. The armature has been removed from the disclosure in Figure 4.

Figure 5 is an end view of the commutator end of the motor.

Figure 6 is an exploded view showing the permanent magnets removed from the stator.

Figure 7 is a transverse cross sectional view taken substantially on the line 7—7 of Figure 4.

Figure 8 is a perspective view of the brush supporting end member.

Figure 9 is a fragmentary end view of the brush supporting end member to show the slot for receiving the brush.

2

Figures 1, 2, 3:
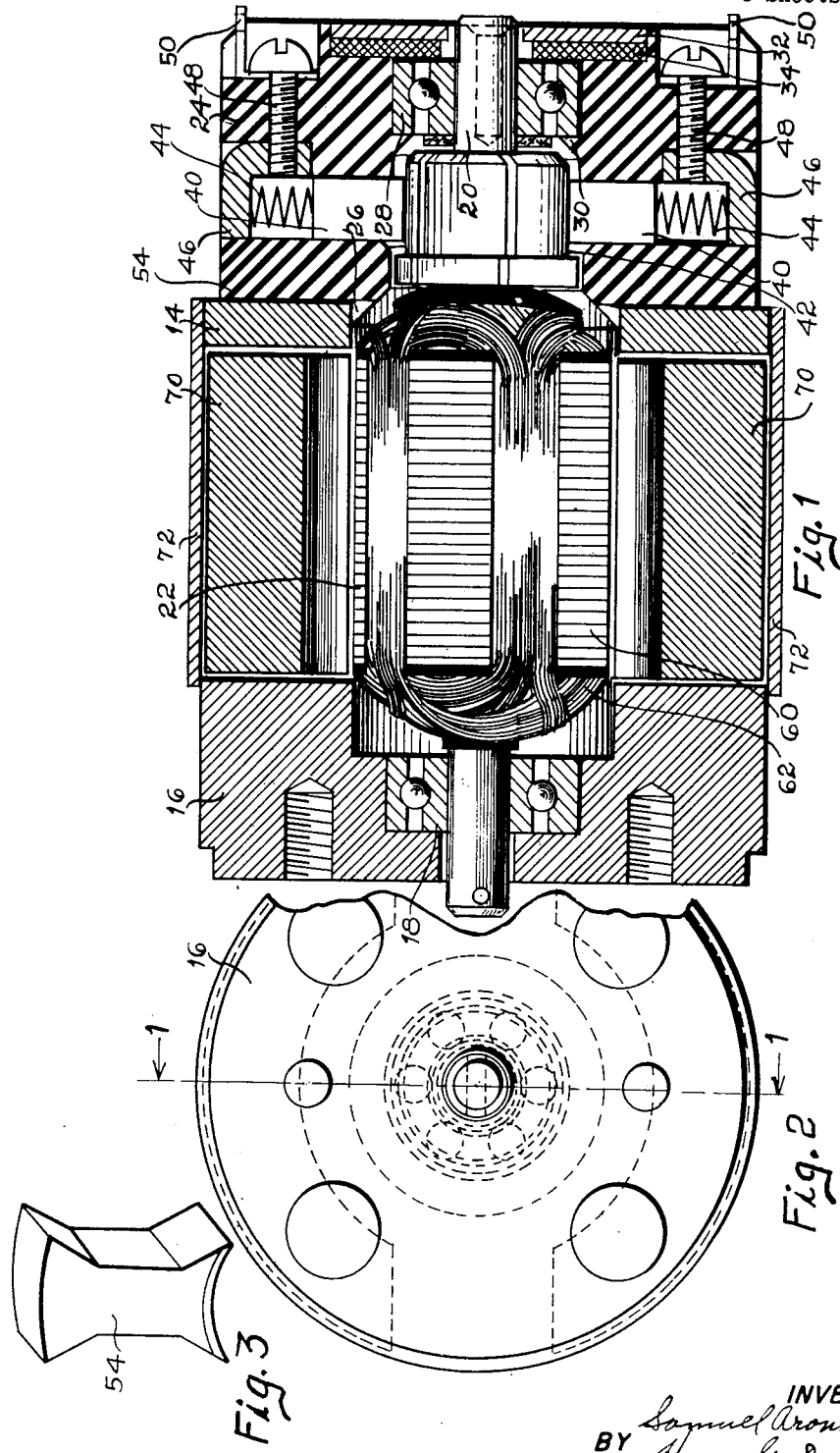
Figure 2 is an end view of the motor looking towards the end opposite the commutator end.
Figure 3 is a perspective view of a brush spacing and retaining member.

Figure 10 is a cross sectional view of the end frame taken substantially on the line 10—10 of Figure 9.

Figures 6 to 10 inclusive have been drawn on a scale substantially one-half of that used in Figures 1 to 5 inclusive.

The motor assembly disclosed herein has been shown as a two-pole motor for the purpose of illustration. The pole pieces cooperate with non-magnetic metallic rings to form seats for arcuate permanent magnets. One of the non-magnetic rings forms an end frame for the motor assembly and provides a support for one of the end bearings. The other non-magnetic metallic ring, in addition to forming a support for the pole pieces, functions as a support for an end piece formed of insulating material, which end piece supports the other motor bearing and provides mountings for the brushes, as will appear more fully from the detailed description that follows.

In the embodiment shown herein for the purpose of illustration, a pair of pole pieces 10 and 12 are mounted between a pair of non-ferromagnetic, annular rings or members 14 and 16. One or both of these rings may be made from metal or from plastic. Member 16 forms a closed end frame and provides a support for the roller bearing 18 supporting the armature shaft 20 of the armature 22. The annular ring 14 is mounted on the side of the pole pieces opposite member 16. A brush supporting and end frame member 24, made of suitable molding material, is provided with a flange or rib-like portion 26 snugly seated within the inner periphery of the ring 14. This rib or flange 26 accurately aligns member 24 with respect to the ring 14 and the pole pieces 10 and 12.

Member 24 supports a bearing 28, having journalled therein the armature shaft 20. The bearing 28 is positioned against a shoulder formed by the inwardly directed rib or flange 30 integral with member 24. The bearing is held in position by a metallic ring 32 abutting a shim or washer 34 and held in position by brass pins 36 press-fitted into suitable apertures in member 24. A suitable shoulder 38, integral with member 24, accurately aligns the metallic ring or washer 32 and the shims 34. This provides a fixed support for the outer race of the bearing 28.

Member 24 is provided with a diametrically disposed groove providing seats for the brushes 40. These brushes are spring-urged towards the commutator 42 by springs 44 held in position by brass lugs 46, rigidly secured in position by suitable screws 48 passing through member 24. Suitable electrical connecting terminals 50, substantially L-shaped, are provided with apertures receiving the screws 48 and held in position by the heads of the bolts or screws 48.

The diametrically disposed groove beyond the portion receiving the brushes 40 merges into V-shaped or tapered portions 52, receiving spacing members 54 of dielectric material holding the brushes in position and so to speak closing the groove. Members 54 are arranged in spaced relation with respect to the enlarged portion of the commutator 42. Due to the contour of the tapered portions 52, the spacing members are clamped in position by member 24 abutting the ring 14. As may best be seen by referring to Figure 4, bolts 63 are used in holding members 10, 12, 14, 16 and 24 together.

Either brush 40 may be removed individually and independently of the other by removing its screw 48, releasing its lug 46 and thereby the corresponding spring 44, so as to permit removal of the brush 40, without disassembling the motor assembly. The armature is conventional and provided with suitable laminations 60 and armature windings 62, as is well known to those skilled in the art.

In order to facilitate assembly, the pole pieces 10 and 12 may be provided with suitable aligning members, such as pintles 11, projecting through or into the rings. If these pintles project through members 14 and 16, the ends of the pintles may be clinched or upset, so as to hold the pole pieces 10 and 12 and the members 14 and 16 in a rigid structure for convenience of assembly.

After the parts thus far described have been assembled, a pair of permanent, arcuate, magnetic members 70 are positioned in the seats formed by the pole pieces 10 and 12 and members 14 and 16. The diameter of the inner arcuate surface of each of the magnetic members 70 is considerably greater than the diameter of the rotor. The pole pieces 10 and 12 are provided with overhanging shoe portions or pole tips 10a and 12a respectively, that provide aligning members or additional supporting portions for these permanent magnets. These magnets are mounted loosely in position. The north pole terminals of the magnet 70 may be seated against the pole piece 12, resulting in the pole piece 10 being a north pole and the pole piece 12 being a south pole, or vice versa, as the case may be. The ends of the magnet are preferably provided with a finished surface, so as to be snugly seated upon like finished surfaces of the pole pieces, thereby eliminating magnetic losses and reducing the reluctance of the flux path. The length of the magnetic members 70 is such that the radii of curvature of the arcuate surfaces of these members are concentric with the axis of rotation of the armature.

The entire assembly may be encased within a metallic shell 72 of non-magnetic material that snugly fits over the assembly, so as to prevent the pole pieces from dropping out of their seats and so as to provide a uniform surface on the periphery of the motor.

The motor disclosed herein is particularly well adapted for use as a light weight control motor operating upon low voltage direct current, as for example, for use in controls in airplanes having 24 volt storage batteries as a source of energy. The motor may be only an inch in diameter and a couple of inches long, or any other suitable dimensions. The use of the permanent magnets reduces the demand for copper windings, thereby reducing the weight.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In an electric motor of the permanent magnet type having a plurality of pole pieces, a supporting ring engaging the pole pieces for supporting the same, a plastic end frame member provided with an annular rib in which the supporting ring is positioned, said plastic end frame member having a pair of diametrically disposed slots, said slots being provided with tapering cut-away portions adjacent the ends of the slots, brushes mounted in said slots, and spacing members of insulating material, said spacing members having enlarged portions seated in the tapering portions of the slots and positioned between the ring and the brushes for holding the brushes in position.

2. An end frame assembly for use in an electric motor of the permanent magnet type having a plurality of pole pieces surrounding an armature, the combination including non-magnetic means located on one side of the armature for supporting said pole pieces, said end frame assembly including a plastic end frame member fixedly attached to said pole piece supporting means, said end frame member being provided with a centrally disposed aperture and an inwardly directed flange projecting into the aperture, bearing means abutting said flange, said plastic end frame member having radially disposed slots, means cooperating with the plastic end frame member and positioned in said slots to form brush supports, brushes mounted in said supports, and resilient means urging the brushes inwardly towards the center of the plastic end frame member.

3. An electric motor of the permanent magnet type having a plurality of pole pieces, a supporting ring engaging the pole pieces for supporting the same, a plastic end frame member, said end frame member having arcuate flange-like projections snugly seated within the inner periphery of the ring, said plastic end frame member having a pair of diametrically disposed slots adjacent said ring, brushes mounted in said slots, and spacing means of insulating material positioned between the brushes and said ring for holding the brushes in position and out of contact with said ring.

4. An end frame assembly for use in an electric motor of the permanent magnet type having a plurality of pole pieces surrounding an armature, said end frame assembly including a non-magnetic ring located on one side of the armature for supporting said pole pieces, a plastic end frame member provided with arcuate flange-like projections snugly seated within the inner periphery of the ring, said end frame member being provided with a centrally disposed aperture and a pair of radially disposed slots, brushes mounted in said slots, insulating means positioned between the brushes and said non-magnetic ring, said insulating means cooperating with the slots in the plastic end frame member for supporting the brushes, and resilient means for urging the brushes inwardly towards the armature.

5. In an electric motor of the permanent magnet type having an armature, a stator assembly including a pair of non-magnetic supporting rings, identical pole pieces having continuous pole faces, said pole pieces being mounted between the supporting rings, said supporting rings and pole pieces cooperating to form recesses bounded by perpendicularly disposed walls, said pole pieces being provided with overhanging shoe portions restricting the recesses adjacent the armature, and a plurality of arcuate permanent magnetic members positioned between said rings and abutting the main body of the pole pieces, said magnetic members being removably mounted for radial removal and insertion and being held in position by the magnetic attraction between the permanent magnets and the pole pieces, the overhanging shoe portions limiting the movement of the permanent magnetic members towards the armature, the number of arcuate members being the same as the number of pole pieces, the polarity of adjacent ends of the magnetic members abutting a common pole piece being of like magnetic polarity.

6. In an electric motor of the permanent magnet type, the combination of an armature, a support having a pair of non-magnetic supporting rings, unwound pole pieces clamped between the supporting rings, said unwound pole pieces being provided with overhanging shoe portions extending towards adjacent pole pieces in close proximity to the armature, means for rigidly interconnecting the pole pieces and the supporting rings, a plurality of arcuate permanent magnetic pieces located between the supporting rings and the pole pieces, said magnetic pieces resting upon the pole pieces and being attracted thereto, the number of arcuate pieces corresponding to the number of pole pieces, said arcuate magnetic pieces being snugly seated between the supporting rings and the pole pieces, a plastic end frame member, said end frame member being provided with an annular rabbet in which is seated one of said supporting rings thereby fixedly locating the end frame member with respect to the stator, said overhanging shoe portions providing abutments limiting the permanent magnets in their movement towards the armature and retaining the permanent magnets in spaced relation with respect to the armature.

7. In an electric motor of the permanent magnet type having an armature, a stator assembly including a pair of non-magnetic supporting rings, unwound pole pieces fixedly attached to the supporting rings, said pole pieces spanning the distance between the supporting rings, said pole pieces having uninterrupted pole faces and being provided with parallel sides merging into duo-functional overhanging shoe portions, said pole pieces and said rings cooperating to form recesses, and a plurality of arcuate permanent magnetic members mounted in the recesses with the ends of the magnetic members abutting the sides of the pole pieces, said overhanging shoe portions forming a barrier between the permanent magnetic members and the armature, said permanent magnetic members being removably mounted outwardly and radially.

8. In an electric motor of the permanent magnet type having an armature, a stator assembly including a pair of non-magnetic supporting rings, unwound pole pieces fixedly attached to the supporting rings, said pole pieces spanning the distance between the supporting rings, said pole pieces being provided with parallel sides merging into duo-functional overhanging shoe portions, said pole pieces and said rings cooperating to form recesses, a plurality of arcuate permanent magnetic members mounted in the recesses with the ends of the magnetic members abutting the sides of the pole pieces, said overhanging shoe portions limiting the movement of the magnetic members towards the armature, said permanent magnetic members being removably mounted outwardly and radially, and a cylindrical shell for encasing the supporting rings and the pole pieces.

SAMUEL ARONOFF.

REFERENCES CITED

The following references are of record in the file of this patent:

UNITED STATES PATENTS

| Number | Name | Date |
|---|---|---|
| 1,405,180 | Bouche | Jan. 31, 1922 |
| 1,564,102 | Nowosielski | Dec. 1, 1925 |
| 1,578,096 | Sandell | Mar. 23, 1926 |
| 1,693,294 | Guterres | Nov. 27, 1928 |
| 2,048,161 | Klaiber | July 21, 1936 |
| 2,230,008 | Nowosielski | Jan. 28, 1941 |
| 2,254,919 | Smith | Sept. 2, 1941 |
| 2,291,775 | Tucker | Aug. 4, 1942 |